3,276,531
VEHICLES FOR INVALIDS FOR TRAVEL OVER HORIZONTAL AND INCLINED SURFACES
Neville E. Hale and Kenneth Gardner, Toronto, Ontario, Canada
Filed Mar. 12, 1965, Ser. No. 439,226
Claims priority, application Great Britain, Apr. 24, 1962, 15,504/62
12 Claims. (Cl. 180—9.24)

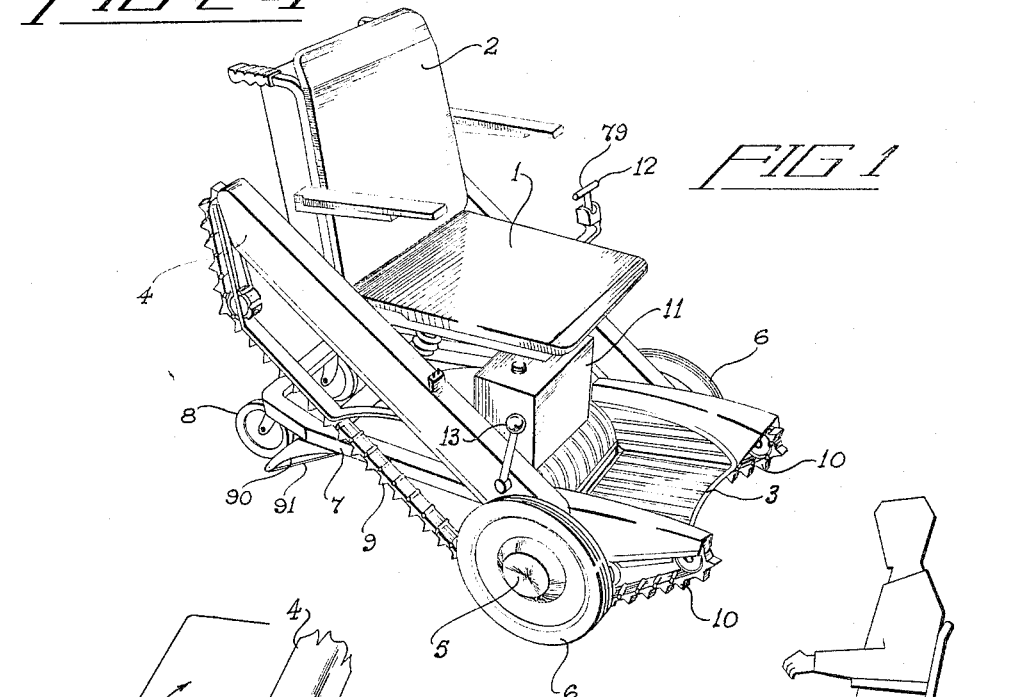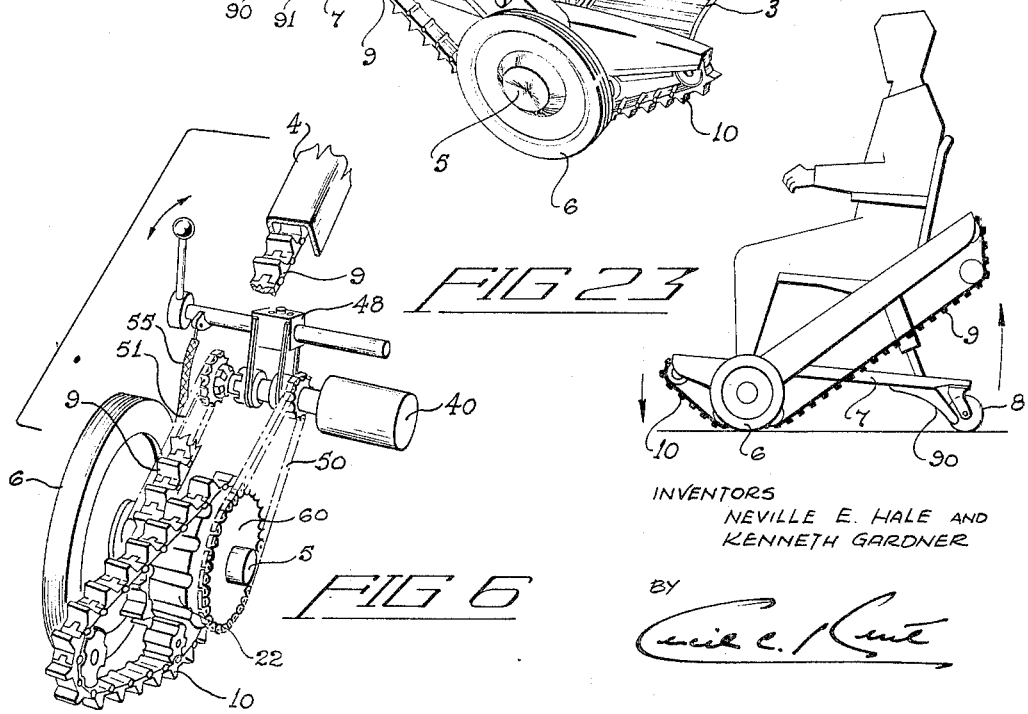

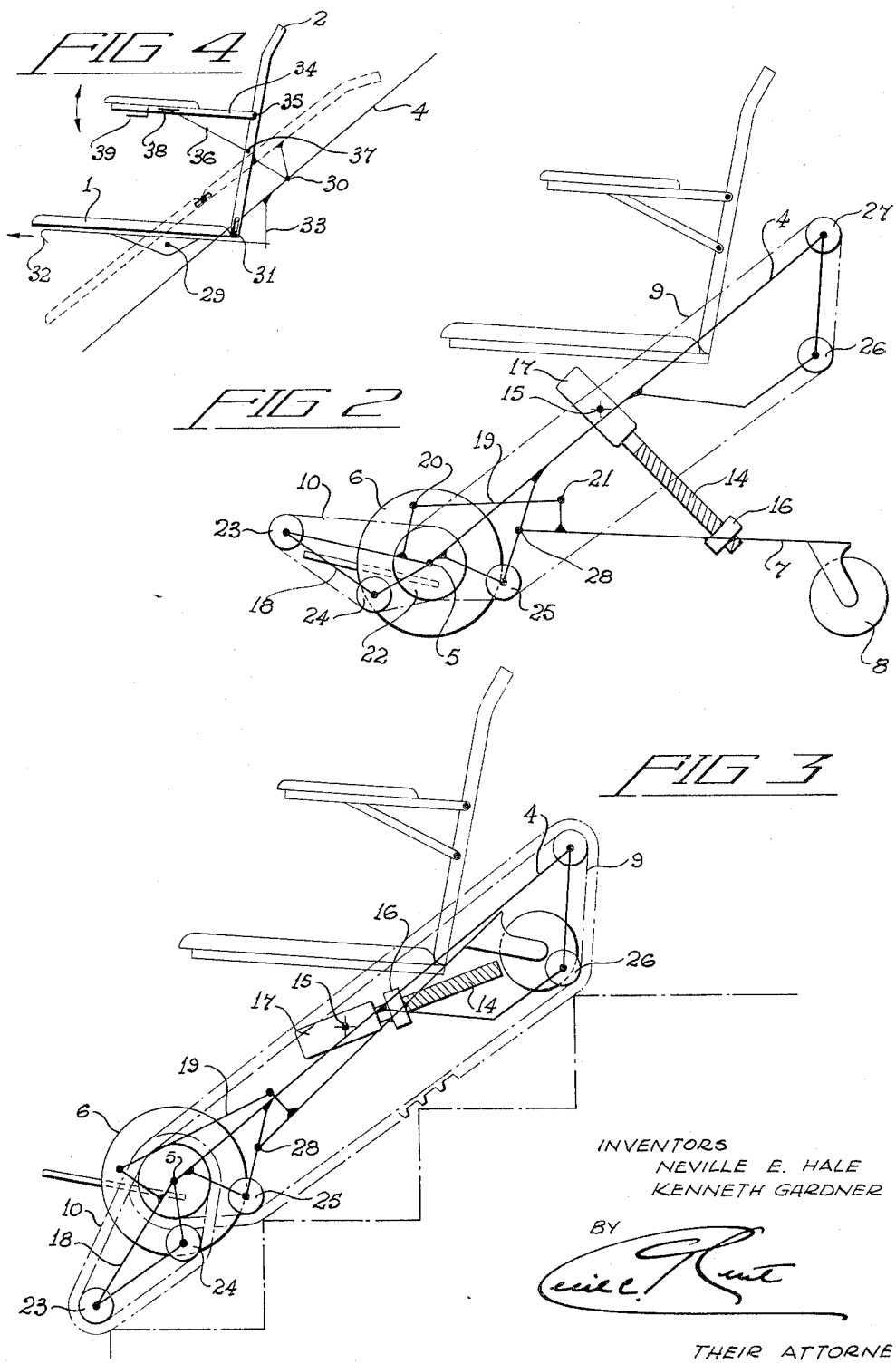

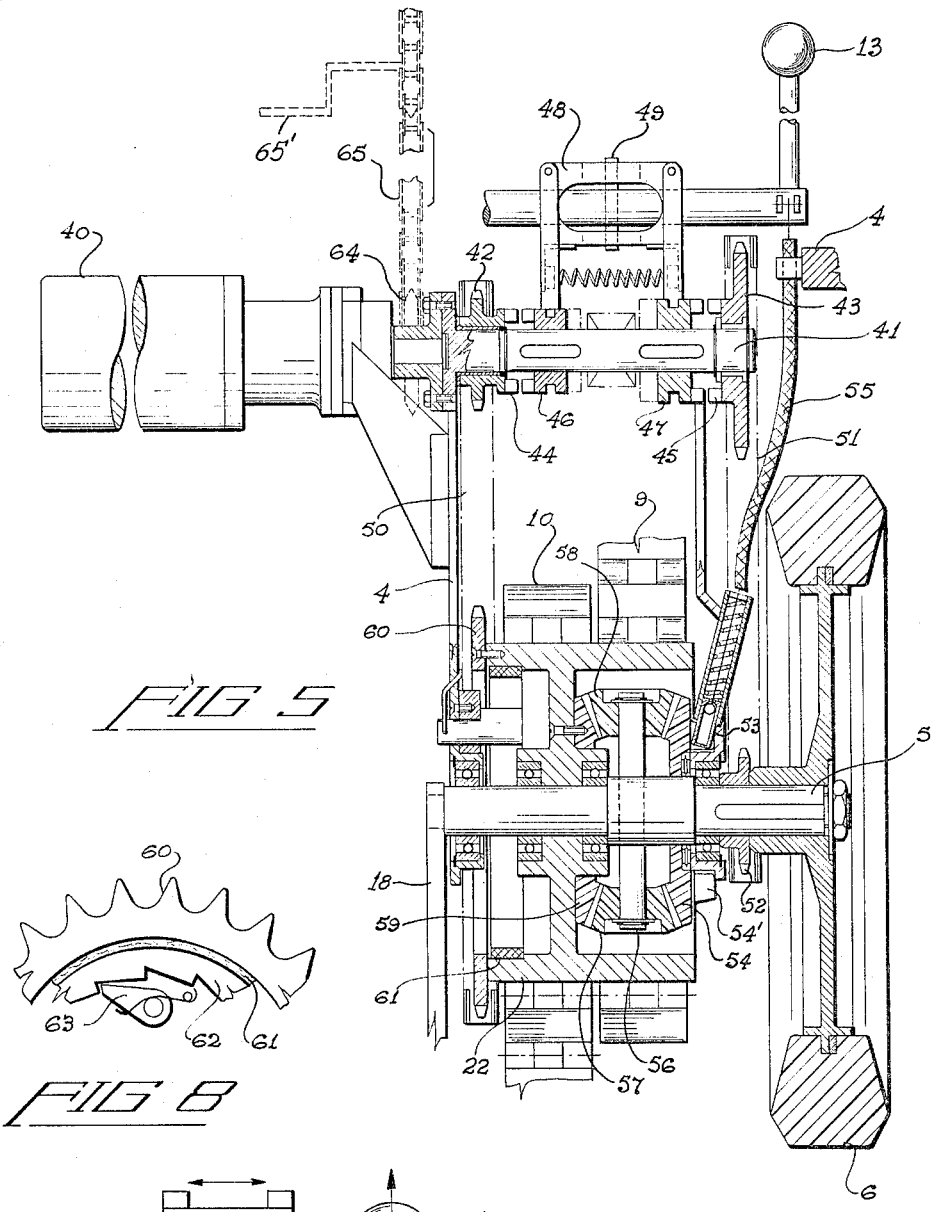

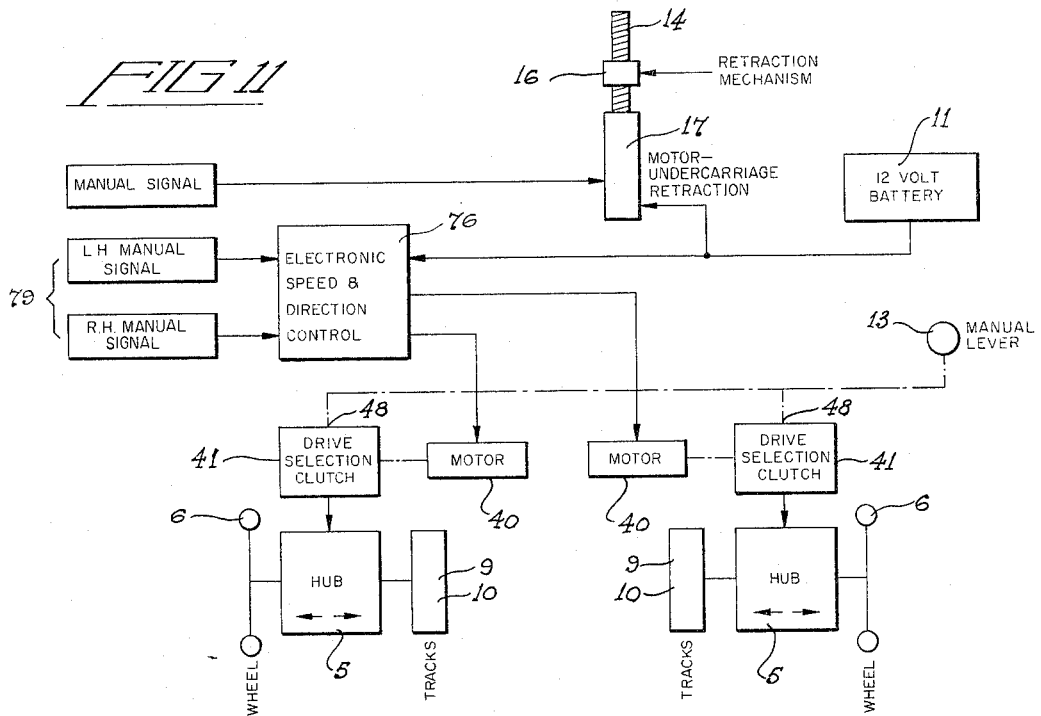
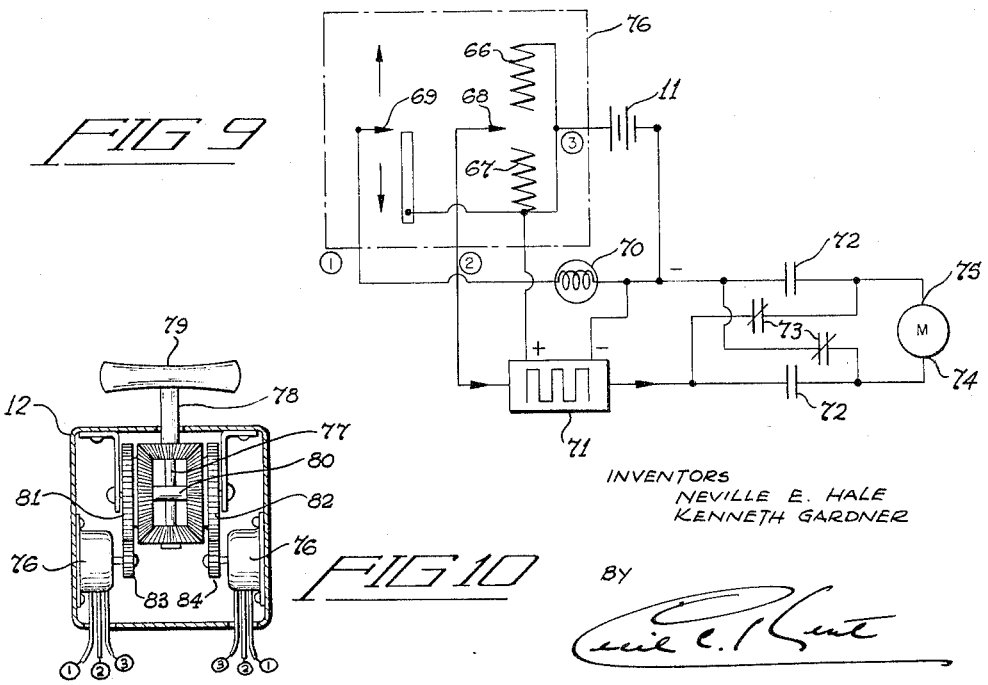

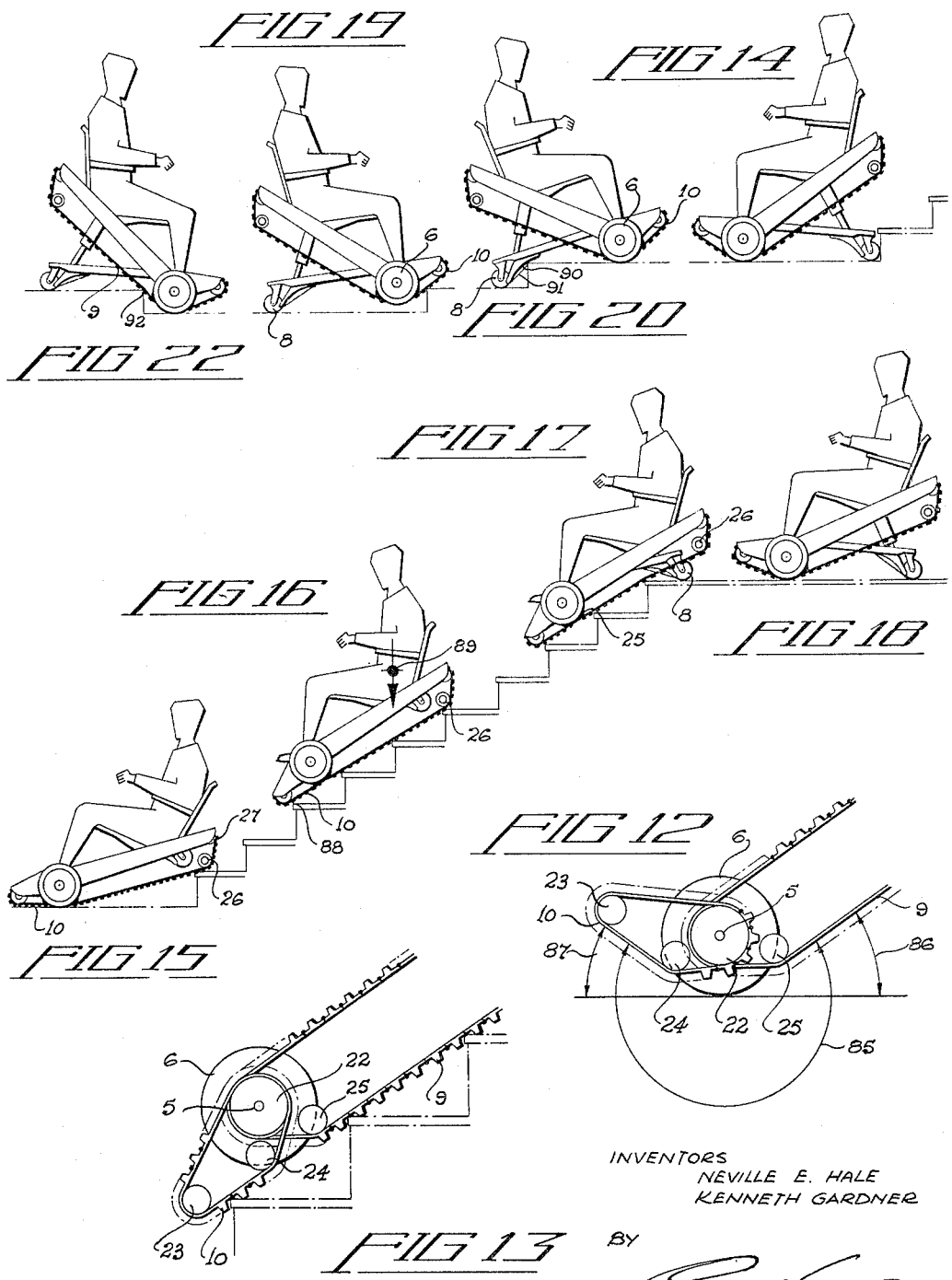

The present invention relates to vehicles for travel over horizontal and inclined surfaces and is a continuation-in-part of our United States patent application Serial Number 272,645, filed on the 12th day of April, 1963.

More particularly our invention involves improvements to wheelchairs at large with particular emphasis on their capability of negotiating stairs and single curbs without the assistance of an attendant.

To our knowledge several attempts have been made over the years to mechanize wheelchairs for the purpose of stair climbing. The prior art available principally suggests two fundamental approaches to this problem; one being the so-called "flip-flop" wheel principle, and the other being the principle of using in the form of endless belts tracks.

The "flip-flop" wheel principle is one in which three wheels are mounted on the arms of a centrally pivotted spider and as the stair climbing proceeds, each of the wheels in turn engages a stair, while the other two wheels travel over this wheel in an arc to engage subsequent stairs in turn. This results in an undulating motion to the rider characterized by a forward pitching due to the fact that the spider shaft must travel in an arc above the shaft of the wheel which is engaged on the stair. Furthermore any one configuration is suited to only one tread to riser ratio thus severely limiting its use. From two viewpoints, therefore, this principle tends to be unacceptable.

Apart from stability, it was apparent that in both the approaches cited above, sufficient recognition had not been given to the fact that climbing a single curb was a separate problem to that of a flight of stairs. In all cases cited above a single curb or a flight of stairs had to be mounted in the rearward direction, after making certain adjustments to the chair, before climbing commenced. These manoeuvres and adjustments are extremely undesirable from the point of view of hazard to the occupant particularly when mounting curbs on busy streets.

A third concept utilizes a multiplicity of bogey wheels for the purpose of climbing both stairs and curbs in a forward direction thus overcoming the curb climbing objections of the other concepts. However, the method of doing so appears to overlook the problem of steering maneuverability when used as a conventional wheelchair on horizontal planes. This is due to the fact that when the wheelchair is on level ground it sits on the several sets of wheels which are capable of rotating on one plane only. Furthermore, this principle overlooks the problem of stair treads that overlap the risers, a very normal situation on stairs constructed from wood.

Apart from the desirability of having wheelchairs capable of climbing both stairs and curbs, the design of wheelchairs, at large, has come under criticism by persons in the medical profession, this criticism being made from the physical, psychological and anthropometric viewpoints. A notable reference in this regard is an article entitled "Wheelchairs" published in the English magazine "Design" of August, 1962, by Nurse Claire Raynor. In this article the very fundamentals of design (for example the seat itself and the method of propulsion) were questioned.

In view of the large propelling wheels of the standard wheelchair, the only practical way for the wheelchair to be collapsed compactly for transportation in an automobile is to bring the two sides of the chair together. This means that the seat and the back of the chair have to somehow be disposed of in the collapsing procedure. Many such wheelchair manufacturers solve this problem by simply providing canvas seating. This proves to be highly unsatisfactory since the seating is subject to far greater wear than the average chair and thus results in sagging and inferior support. Furthermore the seat and back of the chair, not being integrally associated, leaves the lower spine of the individual subject to draughts. It is true that many of the wheelchairs available provide a hinged upholstered seat portion, but to our knowledge, the back rest is nearly always of a canvas material.

The classical means of propulsion, i.e. pushing wheels by hand, is highly unsatisfactory, principally because the occupant's knuckles become barked when negotiating confined spaces, such as doorways and furthermore, dirt picked up from the floor by the tires of the wheels, tends to become transferred to the occupant's wrists and hands.

In the standard wheelchair the seating configuration is rigidly dictated by the configuration of the frame, and therefore, any provision for custom seating to suit the individual becomes a very expensive matter. The casters which, in most cases, are located at the front end of the wheelchair are extremely prone to getting "hung-up" on the smallest of obstacles, such as stones, or ridges in pavement, etc. The footrest which projects ahead of the front wheels is completely inadequate for bearing the weight of the occupant as he enters or leaves the chair.

Fixed armrests are undesirable since they make it difficult for the occupant to reach into his jacket or trousers pockets; they also prevent him from sliding sideways from the chair onto a bed or into a car. The armrest also prevents the occupant from drawing himself up close to a desk or table to work or join company at a meal.

The primary objectives for our invention were laid by the National Inventor's Council as follows:

Without the loss of the conventional wheelchair's versatility and convenience, the design should be based on the parameters:

(a) Maximum width—25 inches.

(b) Collapsibility for transportation in a standard automobile.

(c) Maneuverability to be substantially the same as the conventional wheelchair.

(d) Climbing ability, adequate for the negotiation of normal street curbs or flights of stairs with standard risers and treads.

(e) Propulsion system to be such that the occupant is not called upon to exert more than 10 pound force at any one time. Also the chair should be suitable for alternative manual propulsion by an attendant.

(f) The mechanism must be fail-safe should the occupant become incapacitated during the course of any manoeuvre.

The secondary objectives of our invention are:

(a) To provide rigid, or semi-rigid seating capable of modification to suit individual requirements without interfering with the fundamental configuration of the chair's structure.

(b) To provide a means of propulsion that does not injure or soil the occupant's hands, in combination with a means of control that is effortless and flexible enough to suit a wide range of disability.

(c) To provide a reclining feature for added comfort and swing-away arm rests for the occupant's convenience.

(d) To provide configuration in which the footrest becomes a member capable of bearing the full weight of the occupant without loss of stability.

Further objectives will become apparent in the following description of our invention.

With the foregoing in view, and all those objects, purposes or advantages which may become apparent from consideration of this disclosure and specification, the present invention consists of the inventive concept embodied in the method, process, construction, arrangement of parts, or new use of the same, as herein particularly exemplified in one or more specific embodiments of such concept, reference being had to the accompanying figures in which:

FIGURE 1 is a perspective view of our wheelchair, with the undercarriage extended for ground traversing operation.

FIGURE 2 is a basic geometrical schematic diagram showing the wheelchair in its upright ground traversing condition.

FIGURE 3 is a geometric schematic diagram showing the wheelchair oriented for stair climbing.

FIGURE 4 is a schematic representation of the seat and backrest structure.

FIGURE 5 is a sectional drawing through a wheel hub illustrating the method used for engaging the wheel or tracks to the motor shaft.

FIGURE 6 is a fragmented perspective view showing the relationship between the tracks, the wheel and the motor driving mechanism.

FIGURE 7 is a fragmentary view showing the means for linearly actuating the drive selecting dog clutches from a rotary lever motion.

FIGURE 8 is a fragmentary view showing the one way, fail-safe brake mechanism.

FIGURE 9 is an electrical schematic diagram showing the speed and direction control for the drive motors.

FIGURE 10 shows the operator's single lever control mechanism for adjusting the motor speed adjusting potentiometers.

FIGURE 11 is an overall schematic representation of the entire wheelchair control mechanism.

FIGURE 12 is a geometric schematic view showing the relationship between the primary and secondary track and the wheel when the wheel is bearing the load of the chair.

FIGURE 13 is a geometric schematic view of the relationship between the primary and secondary tracks and the wheel when the tracks are bearing the load of the chair.

FIGURE 14 is a side elevation of the chair immediately prior to ascending a flight of stairs.

FIGURE 15 is a side elevation during the first stage of stair climbing.

FIGURE 16 is a side elevation of the chair in transit on a staircase.

FIGURE 17 is a side elevation showing the chair emerging at a landing above a flight of stairs.

FIGURE 18 is a side elevation at the completion of an ascent of stairs.

FIGURE 19 is a side elevation showing the chair encountering a single curb.

FIGURE 20 is a side elevation in which the chair has partially surmounted a single curb.

FIGURE 21 is a fragmentary view showing the means for raising the trailing undercarriage over a curb.

FIGURE 22 shows the wheelchair descending a curb.

FIGURE 23 is a side elevation of the vehicle illustrating interconnection between the secondary track assembly 10 and the retractable undercarriage 7.

FIGURE 24 is a fragmentary view showing a method of linking the secondary track frame to the undercarriage frame. This view also shows the undercarriage retraction means.

In the drawings, like characters of reference designate similar parts in the several figures.

In describing our wheelchair we will first deal with the construction and then the operational aspects thereof.

CONSTRUCTION

General

With reference to FIGURE 1, our wheelchair comprises a load container or seat 1 with a backrest 2 and a footrest 3 supported on an inclined chassis-frame 4. The lower forward end of the chassis-frame supports a pair of drive shafts 5, each supporting a main drive or ground wheel 6 and a retractable undercarriage 7 with trailing swivel casters or rear wheels 8. The drive shafts 5 are capable of imparting a driving motion to a pair of endless primary track assemblies 9 and a pair of endless secondary track assemblies 10.

The driving power is provided by a battery 11. Steering and speed control is provided by a "control" lever mechanism 12 which, being a purely electrical controlled device may be situated anywhere on the chair to suit the operator's convenience. The selection of wheel drive, track drive or neutral is provided by a lever 13 which may be situated to the left side or right side of the chair to suit individual preference.

Basic geometry

The basic geometry of the wheelchair is shown diagrammatically in FIGURES 2 and 3. FIGURE 2 shows the wheelchair in its normal mode of operation for traversing flat surfaces. The main chassis number 4 is inclined and supported at its forward end by wheels 6 and maintained in its inclined position by the predominantly underlying undercarriage 7 in combination with strut 14 in the form of a screwed shaft which pivots about a trunnion mount 15 on the chassis 4 and passes through a fixed nut 16 on the undercarriage 7. Thus the screwed shaft 14 and the fixed nut 16 when driven by a motor 17 comprises the retracting means for the undercarriage.

Rotatably mounted about each drive shaft 5 is a secondary track-carrying frame 18 and this frame is operatively connected to the undercarriage by a link member 19 between pivot 20 on frame 18 and pivot 21.

A track-driving sprocket 22 is co-terminal with wheel 6, being commonly mounted on drive shaft 5. The secondary track carrying frame 18 carries two sheaves 23 and 24 whereas the main chassis frame 4 carries three sheaves 25, 26 and 27. The secondary track 10 wraps around the driving sprocket 22, also sheaves 23 and 24 forming a substantially triangular configuration. The primary track wraps around the drive sprocket 22 (in juxtaposition with the secondary track) also sheaves 25, 26 and 27 forming a quadrilateral configuration. The relationship is shown in FIGURE 6 in which, for clarity, the secondary track-carrying frame 18 has been omitted.

When it is desired to convert the wheelchair to a tracked vehicle for stair climbing, the screwed strut 14 is rotated by motor 17 thus drawing the fixed nut 16 towards the motor. Thus the undercarriage 17 is connected to the chassis-frame 4 about pivot 28 on the chassis-frame 4 whereby pivotal subsidence is permissible until the undercarriage and its associated casters 8 are drawn within the confines of the quadrilateral configuration of the primary track 9. Simultaneously the linkage between the undercarriage 7 and the secondary track carrying frame 18, namely link 19, causes the frame 18 to pivot in a vertical plane about shaft 5. When the undercarriage is fully retracted the secondary track frame 18 has rotated sufficiently for the under-run of secondary track 10, namely, the portion between sheaves 23 and 24, to lie on the produced plane of the under-run of the primary track 9, namely, the portion of track between sheaves 25 and 26. This is clearly shown in FIGURE 3. It will also be observed that the under-runs of both the primary and secondary tracks now lie approximately tangential to the periphery of the driving wheel 6.

FIGURE 4 diagrammatically shows the method of mounting a foldable chair on the chassis 4. The seat of the chair is pivoted at a point 29 and the back of the chair is pivoted at a point 30, both points being situated on the chassis 4. The back of the seat and the lowermost point of the back of the chair are connected by a hinge member 31. A spring-loaded latch 32 mounted to the underside of the seat 1 engages with a bracket 33 on the chassis 4 to lock said seat in operational position, When the latch 32 is withdrawn from the bracket 33, the seat member may be pivoted down in line with chassis 4, and through hinge 31 and pivot point 30, the back member 2 is also dropped into the same plane as that of the seat 1.

An armrest 34 pivoted at point 35 on the backrest 2 is maintained in position by support link 36 which is also pivoted from the back member 2 at point 37 having at its opposite end a slide block 38 within the armrest 34. When a latch 39 is actuated, the armrest may be lowered to lie in the same plane as the backrest 2.

From the foregoing, it will be recognized when it is desired for the chair to be reduced to is minimum dimensions for transportation in an automobile or for storage, the undercarriage may be retracted as shown in FIGURE 3 and the seat collapsed in line with the undercarriage 4 as shown in FIGURE 4 thus bringing the vehicle down to its minimum size, namely about 25 x 11 x 50 inches.

*Means of propulsion*

The conventional wheelchair is highly manoeuverable since the operator can propel either wheel independently. For maximum turnability one wheel may be turned in a forward direction while the other is turned in a rearward direction. The principle with our wheelchair is similar except that each wheel 6 is controlled from a separate electric motor. FIGURES 5 and 6 illustrate our drive mechanism for each wheel.

Our drive assembly for each wheel comprises a reversible motor 40 coupled to a clutch shaft 41 and a hub assembly built onto drive shaft 5.

On clutch shaft 41 are two freely rotatable chain sprockets 42 and 43. Integral with sprocket 42 is one half of a dog clutch 44. Integral with sprocket 43 is one half of a dog clutch 45. Keyed and axially slideable on shaft 41 are a pair of dog clutch halves 46 and 47 being engageable with adjacent halves 44 and 46 respectively. Axial movement to clutch halves 46 and 47 is imparted by lever 13 in combination with assembly 48 in which cross pin 49 converts a rotary motion to an axially linear one (see FIG. 7). A forward motion of lever 13 causes clutch halves 44 and 46 to engage whereas a rearward motion causes clutch halves 45 and 47 to engage.

The hub assembly comprises shaft 5 with wheel 6 keyed thereto and track sprocket 22 rotatably mounted thereon. Track sprocket 22 is coupled to the clutch assembly through roller chain 50 and attached chain sprocket 60 whereas shaft 5 and thus wheel 6 are coupled to the clutch assembly through roller chain 51 and keyed chain sprocket 52.

Built within the track sprocket 22 is a differential gear assembly comprising one differential gear 59 solidly attached to the web of track sprocket 22, a matching differential gear 54 which is freely rotatable on shaft 5 and a pair of planetary gears 57 which are freely rotatable on a cross-shaft 56, said cross-shaft being integral with shaft 5. On the rearward side of differential gear 54 is a castellated boss 54' within which a plunger 53 is engageable. When plunger 53 is engaged, differential gear 54 is locked to the vehicle frame 4 but when plunger 53 is withdrawn by a pull cable 55 coupled to lever 13, differential gear 54 is freely rotatable.

Whereas operation in general will be dealt with separately later in this specification it is convenient to now discuss the specific operation of the drive mechanism immediately following the description of construction above.

Lever 13 is provided in order for the occupant to select wheel drive, track drive or neutral.

When lever 13 is moved rearwardly pull cable 55 withdraws plunger 53 to allow differential gear 54 to be capable of free rotation on shaft 5. Simultaneously dog clutch halves 45 and 47 mesh. Thus when motor 40 runs, shaft 41 imparts through sprocket 43, chain 51 and sprocket 52, a driving force to drive shaft 5 and wheel 6. Since cross shaft 56 will be turning but since also differential gear 54 can freely rotate on shaft 5 planetary gear 57 will rotate and will spin differential gear 54 in a "free-wheeling" motion. Differential gear 59 will thus receive no driving force from the planetary gear and thus the tracks will remain stationary.

When lever 13 is moved forwardly, plunger 53 will engage the castellated boss 54' on differential gear 54, locking said gear to the vehicle frame. Simultaneously dog clutch halves 45 and 47 will become disengaged whereas dog clutch halves 44 and 46 will mesh.

Now when motor 40 is driven a drive is imparted from shaft 41 to the track sprocket 22 through chain sprockets 42 and 60 and roller chain 50, thus developing a direct drive to the tracks 9 and 10. It is, however, important (for reasons that will later become apparent) that the wheel is also driven *but at the same peripheral speed as the tracks*. This occurs, since differential gear 59 turns with the track sprocket 22, differential gear 54 is locked and planetary gears 57 rotate about cross shaft 56 and impart to said shaft sideways forces which cause shaft 5 to rotate at *half the speed* of track sprocket 22. Now providing the diameter of wheel 6 is twice that of the track sprocket pitch diameter, the peripheral speed of both tracks and wheel will be equal.

When lever 13 is in a central position, plunger 53 remains withdrawn and also both dog clutches are disengaged. Thus since differential gear 54 can rotate freely, said gear will spin at no load as the planetary gears orbit around shaft 5 while spinning on cross shaft 56. In this manner the wheelchair free wheels suitable for propulsion by an attendant.

A fail-safe brake 61 is shown in FIGURES 5 and 8 and is located in the hollow interior of the track sprocket 22. Integrally connected to the brake lining 61, there is a circular ratchet 62 which is engaged to a pawl 63, said pawl being mounted on the web member of the track sprocket 22. Thus, with reference to FIGURE 8, when the track sprocket 60 is driving clockwise, it has to drive over the resistance of brake 61, whereas when it is travelling anti-clockwise, the brake provides no resistance to motion. By this device it will be obvious that when the chair is climbing the stairs, it is climbing without the restraining action of brake 61. However, when it is descending the stairs, it has to drive over the resistance of brake 61 and thus any mechanical failure or incapacity on the part of the occupant cannot cause the chair to run away out of control.

Whereas a preferred method of propulsion is by means of motor 40, adaption for hand-crank operation may be easily made by providing a sprocket 64 at the point where the motor couples the cross-shaft 41 (FIG. 5). A chain 65 may then be simply led up to a handcrank 65 provided at a convenient location for the operator.

MOTOR, SPEED AND DIRECTION CONTROL

As previously stated, each motor 40, FIGURE 5, controls one of the drive wheels 6. Each motor has both speed and direction control. One way of achieving this is shown in schematic diagram, FIGURE 9.

A pair of resistors 66 and 67, are connected to battery 11 as shown. A sliding takeoff contact 68 is provided to give an increasing voltage output the further it moves to either side of its central "dead band" position. A second sliding contact 69 moves integrally with contact 68 and when moving in the upward direction it is open-circuited while moving in the downward direction it picks up one side of the battery connection. Thus a relay coil 70 connected between sliding contact 69 and the negative side of the battery 11 is energized when the slider moves down and de-energized when the slider moves up.

The take-off wire from sliding contact 68 feeds into an electronic square wave pulse generator 71, the output of which is fed to motor 40.

Pairs of relay contacts 72 and 73, the former of which are normally open and the latter normally closed, are actuated when relay coil 70 becomes energized, namely when slider contact 69 is in the downward direction. Thus, when relay 70 is energized contacts 72 are closed and contacts 73 are open and consequently the negative line is connected to motor terminal 75 and the positive line to motor terminal 74. Conversely when slider contact 69 is in the upward direction and relay 70 is de-energized, contacts 72 are open and contacts 73 are closed causing negative potential to be applied to motor contact 74 and positive potential to contact 75. This reversal of polarity naturally reverses the direction of the motor. The movement of sliding contact 68 in either direction from a central position causes an increase in voltage input to the pulse generator 71 and thus broader pulses at the output thereof which results in an increase of motor speed.

A method for physically controlling both motors from a single lever is shown in FIGURE 10. Each speed control unit 76 (comprising resistor 66 and slider contacts 68 and 69) is spur-gear coupled to one side of a differential gear system 77. The planetary gear shaft of this differential system 78 is extended to a "T" bar hand grip 79.

When the "T" bar is pushed forward or pulled rearward the entire differential gear system pivots about its own shaft 80 and this turns the spur gears 81 and 82 in a common direction which, in turn, drive the pinions 83 and 84 on the two speed control resistors 66 and 67 within each controller 76. Since both pinions move in the same direction when the "T" bar is moved forward or backward, both motors drive in the same direction and at the same variations in speed.

If it be assumed that "T" bar 79 is moved forward, sliding contact 69, FIGURE 9, moves upward, and when the "T" bar 79 is moved rearward the sliding contact 69 moves downward. The forward direction of "T" bar 79 moves the chair in the forward direction and the rearward pull of "T" bar 79 moves the chair in a rearward direction.

To obtain manoeuverability it is necessary to drive the motors at different speeds and, in some cases, in opposite directions. This facility is provided by twisting "T" bar 79 so that its shaft 78 rotates axially. This drives the two motor controller 76 in *opposite directions*, thus driving one motor forward and one motor rearward. The forward or rearward movement of "T" bar 79 when combined with various degrees of twist, provides infinite control and manoeuverability of the wheelchair. Not shown in FIGURE 10 but obviously a matter of simple mechanics, the "T" bar should be spring-centred, both for forward-rearward motion and for twist.

The integrated mechanical and electrical control mechanisms described in the specification above are shown in schematic form in FIGURE 11.

OPERATION

Track wheel relationship

The very essence of our invention lies in the ability of our vehicle to convert from wheel operation to track operation. Our means for achieving this characteristic change is best illustrated in schematic FIGURES 12 and 13.

FIGURE 12 shows the relative positions of primary track 9, secondary track 10 and driving wheel 6 when the chair is operating on horizontal surfaces and supported on its wheels. In this condition the entire load bearing is taken by wheel 6 whereas both primary and secondary tracks 9 to 10 are carried clear of the ground, their under-runs having an inferior reflex angular relationship one to the other as illustrated by arc 85. The relationship between the under-run of primary track 9 to the ground is characterized by acute angle 86 and the relationship between the secondary tracks under-run and the ground is characterized by acute angle 87. It is important to note also that the sheaving is arranged such that the under-runs of both primary and secondary tracks 9 and 10 are substantially tangential to the periphery of the driving wheel 6.

When the chair is converted for track operation, that is to say when the undercarriage is retracted by motor 17 as shown in FIGURE 3, the secondary track assembly, being operatively connected to the undercarriage through link 19, FIGURES 2 and 3, rotates in a vertical arc about drive shaft 5 until the secondary track under-run, namely the portion of track between sheaves 23 and 24, lies on the produced plane of the under-run of the primary track 9, namely the portion of track between sheaves 25 and 26. That is to say the primary and secondary track under-runs form an in-line relationship. When this occurs the load previously borne by the vehicle supporting wheel 6 is transferred from this wheel to the primary and secondary tracks 9 and 10.

Operation on horizontal surfaces

When the wheelchair is operating on floors, the tracks are oriented as shown in FIGURE 12 and are carried clear of the ground as previously described. Lever 13 will be positioned to select wheel drive and thus the tracks will remain stationary. The operator will manipulate the "T" bar control 79, FIGURE 10, and will be able thereby to obtain complete manoeuverability over the chair. The extremes of manoeuverability are from zero to full forward speed, zero to full rearward speed and one wheel driving forward with the other driving rearward to obtain the spinning action about the point midway between the two vehicle supporting wheels 6. These extremes of manoeuverability are not impeded by the rear wheels 8 since they are swivel casters.

Stair climbing

In preparation for stair climbing, the wheelchair is manoeuvered and backed up to the first stair raiser as shown in FIGURE 14. Motor 17 is then energized to retract the undercarriage and bring the secondary track down into ground-pressing contact as shown in FIGURE 15. Optionally, complete retractibility of the undercarriage can be achieved while maintaining the entire under-run of the secondary track 10 in ground-pressing contact. Linkage 19, shown in FIGURES 2, 3 and 24 may be provided with a certain amount of compressibility by making it telescopically biassed towards extension with a compression spring within the telescoping portion. The secondary track 10 provides a substantial degree of additional traction for the initial stages of stair climbing. Between the upper and lower runs of the primary track 9 there is an intermediate run between sheaves 26 and 27 which forms an acute angle with the upper run and an obtuse angle to the lower run of said track, such that it presents an advantageous angle to the second stair for raising the back end of the chair as it proceeds.

As the wheelchair proceeds upwards, FIGURE 16, the secondary track 10 effectively provides substantial stability by placing the lower pivotal point 88 of the chair immediately below the rider's feet and thus places the centre of gravity 89 well back therefrom.

As the back of the chair emerges over the landing at the top of the flight of stairs, FIGURE 17, the operator energizes undercarriage motor 17 such that the undercarriage wheels 8 move down and contact the landing surface to support the rear end of the chair as the latter phases of climbing take place. By the time the chair has fully emerged at the top landing it is substantially in the upright position ready to proceed on its way, FIGURE 18.

Descending a flight of stairs is essentially the reverse of the above sequence commencing at FIGURE 18 in which the operator is approaching the stairs while simultaneously reclining the chair by means of motor 17. When properly judged the transition from the horizontal landing to the staircase can be carried out in a single smooth operation. The smoothness of this operation is substantially assisted by having the under-run of the primary track 9 free-spanning between its lower sheaves 25 and 26 such that it can deflect as shown in FIGURE 17.

It will be noted that when the track drive is engaged the wheels 6 are being driven in a very low gear equivalent to the same peripheral speed of that of the tracks. This is approximately a 16 to 1 reduction over the normal floor traversing wheel speed.

*Negotiating single curbs*

An important feature of the secondary tracks 10 is that when they are in their raised positon (i.e. normal floor traversing condition) they provide a means for raising the front end of the wheelchair over a curb. This is shown in FIGURE 19.

When a curb is encountered the operator will move lever 13 from wheel drive to track drive and will then immediately proceed to drive forward. Since the peripheral speed of wheels 6 and track 10 are the same in this mode of operation, the tracks will encounter the curb and raise the front end of the chair from the ground until the wheels again take up the drive at the new level. At this point the operator will again select wheel drive and then proceed forward. As the back end of the chair approaches the curb, FIGURE 20, the curb will be encountered by a guide 90 usually in the form of a plate having the concave under-profile best shown in the accompanying FIGURE 21, which may optionally be fitted with a free-running belt 91. Thus with the forward momentum of the chair the rear end of the undercarriage is raised until casters 8 engage the upper level.

When descending a curb the operator will again select track drive and thus as wheels 6 pass over the top of the curb the chair will become supported on the under-run of primary track 9 at point 92, FIGURE 22, which will allow the front end of the chair to be gently lowered to the lower level. As the chair proceeds on its way the rear casters will drop over the curb to the lower level. To prevent a jarring motion to the rider, the undercarriage retracting means, screwed shaft 14 and nut 16, incorporate a rubber shock absorber device.

Since various modifications can be made to the invention herein described within the scope of the inventive concept disclosed, it is not intended that protection of the said invention should be interpreted as restricted to the modification or modifications or known parts of such concept as particularly described, defined or exemplified, since this disclosure is intended to explain the construction and operation of such concept and is not for the purpose of limiting protection to any specific embodiment or details thereof.

What we claim as our invention is:

1. A vehicle designed to travel over horizontal surfaces, and to ascend or descend inclines, comprising in combination (a) a load-container, (b) a chassis-frame, (c) a pair of endless track assemblies inclined from the horizontal on which said vehicle may be propelled upon long inclines, (d) an undercarriage connected to said chassis-frame, (e) means for varying the relative inclination of said container, chassis-frame, and track assemblies as a unit to said undercarriage, (f) means including a pair of front ground wheels for supporting said vehicle during travel over horizontal surface, (g) means for driving said vehicle and said track assemblies, said track assemblies having upper, under, and short, rear intermediate runs, (h) at least one rear ground wheel connected to said undercarriage, said means for varying relative inclination comprising an adjustable length strut extending between said chassis-frame and said undercarriage, said undercarriage being pivotally connected to said chassis-frame near said front ground wheels, and means for operating said strut, the rear ends of said track assemblies projecting rearwardly beyond said rear wheel in the horizontal travelling position of said vehicle to permit lowering of said rear ends onto a step when said rear wheel is substantially in contact with the riser of said step, (i) rear-end climb-start assisting means in the form of upper and lower, vertically spaced sheaves at the rear ends of said track-assemblies between which said intermediate runs extend, said intermediate runs constituting part of said rear-end climb-start assisting means, and forming an obtuse angle with said under-runs, and an acute angle with said upper runs, and (j) combined climb-start, traction augmenting, climb-stabilizing, and single-step negotiating means at the front end of said vehicle, said means comprising a secondary track assembly which is short relative to said primary track assemby, and positioned in advance of, and adjacent to the forward lower end of said primary track assembly.

2. A vehicle designed both to travel over horizontal surfaces, and to ascend or descend inclines, comprising in combination (a) a load container, (b) a chassis-frame, (c) a pair of endless primary track assemblies inclined from the horizontal on which said vehicle may be propelled upon long inclines, (d) a secondary track assembly which is short in length relative to said primary track assemblies constituting a combined traction-augmenting, climb-stabilizing, and single step negotiating means, positioned in advance of, and adjacent the forward lower end of said primary track assembly, (e) means for varying the inclination of said container, chassis-frame and primary track assembly as a unit, (f) means including a pair of wheels for propelling said vehicle horizontally, and (g) means for driving said primary and secondary track assemblies in unison, said track assemblies having upper runs and under-runs, said under-runs being substantially tangent to the lower quadrants of said wheels, said secondary track assembly being movable in a vertical plane.

3. The vehicle according to claim 2 in which said secondary track assembly normally projects at an upward incline forwardly and away from the front end of said primary track assembly, and is swingable in a vertical arc about the axis of said wheels, the front end of said primary track assembly and the rear end of said secondary track assembly being co-axially sheaved, the sheaves for said ends being also co-axial with said wheels.

4. The vehicle according to claim 2 which includes a rear wheel and a third track assembly connected to said undercarriage, the under-run of said third track being slightly tangent to one of the lower quadrants of said rear wheel, and inclining upwardly and forwardly therefrom to assist in the smooth negotiation of a single step between two horizontal surfaces.

5. In combination with the third track according to claim 4, which includes a guide, said guide having a concave under-profile adjacent the under-run of said third track, said under-run substantially spanning the ends of said profile in chordal relationship to assist the smooth transition of the rear end of said vehicle from one horizontal plane to another.

6. A vehicle designed to travel over horizontal surfaces, and to ascend or descend inclines, comprising in combination (a) a load container, (b) a chassis-frame, (c) a primary endless track assembly on which said vehicle may be propelled when negotiating long inclines, said primary track assembly being longitudinally parallel with said chassis-frame, and having a rear part which embodies an upper-run and an under-run, said rear part being sheaved so as to provide, between said runs, an intermediate run which is obtusely angulated with respect to said under-run, and acutely angulated with respect to said upper-run to assist ascent onto an incline such as a flight of stairs, (d) a secondary track assembly for negotiating a substantially single, and relatively shallow rise between two surfaces, (e) means for varying the inclination of said load container, chassis-frame, and primary track assembly with respect to the horizontal, as a unit, said means for varying inclination embodying an undercarriage pivotally connected to and at least predominately underlying said chassis-frame, (f) means for propelling said vehicle, and (g) means for rotating said secondary track assembly, said secondary track assembly being movably connected to the front end of said chassis-frame between a position for negotiating said rise, and a ground-pressing position to provide additional traction for said primary track assembly when said vehicle is commencing a long ascent, said secondary track assembly being in the form of an endless belt assembly the under-run of which inclines upwardly and away from said vehicle when said vehicle is in position for horizontal travel, said secondary track assembly being substantially co-terminus with said primary track assembly.

7. In a stair-climbing vehicle, in combination a pair of rotatable, endless tracks each including end sheaves of which one is a drive-sheave, and an intermediate sheave, said vehicle including a pair of vehicle-supporting wheels, each of said wheels being co-axial with said drive-sheave, means for driving said tracks and said wheels at substantially similar peripheral speeds, said tracks each including an under-run which passes externally around all said sheaves, said intermediate sheave being adjacent but so radially offset from the axis of said wheel as to render said under-run substantially tangent to a lower peripheral portion of said wheel, and normally acutely angled with respect to the horizontal, whereby said tracks and wheels co-operate to negotiate a substantially single stage step between two adjacent surfaces, said track assemblies being arranged for vertical rotation at the rear ends thereof, in an arc about the axes of said wheels, and being laterally displaced therefrom, said vehicle including means for vertically rotating said track assemblies downwardly into ground-pressing contact for relieving the load on said wheels at the commencement of the stair climbing operation.

8. A vehicle designed to travel over horizontal surfaces, and to ascend or descend inclines which at least includes, in combination, (a) a load container, (b) a chassis-frame, (c) a pair of endless primary tracks on either side of said load container, said tracks including an under-run by which said vehicle may be propelled on inclines, (d) a pair of secondary tracks projecting forwardly of said primary tracks, (e) a pair of vehicle supporting wheels on either side of said load container, (f) means for varying the inclination of said container, chassis-frame, and primary tracks as a unit, (g) means for driving said primary and secondary tracks, and (h) means for rotating said secondary tracks in an arc vertically about the ends thereof which are nearer to said primary tracks, the under-runs of said secondary tracks being substantially tangent to the peripheries of said wheels, said means for driving said tracks including a drive-shaft, said secondary tracks extending around said shaft, the under-runs of said primary and secondary tracks being rotatable between positions which form an inferior reflex angular relationship, and an in-line relationship between them, said in-line relationship causing said vehicle-supporting wheels to be relieved of their load, and permitting said secondary tracks to provide stability and additional traction when said vehicle is negotiating long inclines, said undercarriage and chassis-frame being also relatively retractable, said secondary tracks being arranged to rotate about the axes of said supporting wheels, said secondary tracks being operatively connected to said undercarriage, the under-runs of said secondary tracks lying on the produced plane of the under-runs of said primary tracks when said undercarriage is retracted, and means for effecting such retraction.

9. The vehicle according to claim 8 in which the said under-runs of said primary and secondary tracks are rotatable between positions which form an inferior reflex angular relationship, and an in-line relationship between them, and in which the front and rear parts respectively of said primary and secondary tracks are sheaved so as to permit said supporting wheels to bear the load of said container when said vehicle is on a substantially horizontal surface, said tracks being relieved of said load at that time, and in said reflex angular relationship.

10. A vehicle designed to travel over horizontal surfaces, and to ascend or descend inclines, comprising in combination (a) a load-container, (b) a chassis-frame, (c) a pair of endless primary track assemblies inclined from the horizontal on which said vehicle may be propelled upon long inclines, (d) an undercarriage connected to said chassis-frame, (e) means for varying the relative inclination of said container, chassis-frame, and primary track assemblies as a unit, to said undercarriage, said track assemblies being positioned upon either side of said chassis-frame and undercarriage, (f) means including a pair of front ground wheels for supporting said vehicle during travel over horizontal surfaces, (g) means for driving said vehicle and said track assemblies, (h) at least one rear ground wheel connected to said undercarriage, (i) a pair of endless secondary track assemblies at the lower ends of said primary track assemblies, said secondary track assemblies each having a vehicle-connected end, and a distal end, said secondary track assemblies being short relative to said primary track assemblies, and projecting therefrom, said connected ends overlapping the lower ends of said primary track assemblies, said secondary track assemblies each having three sheaves mounted in spaced, triangular relationship, said sheaves comprising a drive sheave, a distal sheave, and an under sheave, upper, lower, and intermediate secondary track runs between said sheaves, said drive sheaves being co-axial with said wheels, the axes of said lower sheaves being in the vicinity of the outer perimeter of said wheels so that said lower runs are substantially tangent to said outer perimeters, and (j) means for rotating said secondary track assemblies in a vertical arc about the axes of said drive sheaves with said lower runs remaining in the aforesaid tangential relationship in all positions of said secondary track assemblies.

11. The means for rotating said secondary track assemblies according to claim 10 which comprise a linkage system extending between said secondary track assemblies and said undercarriage operable when the relative inclination of said undercarriage and chassis-frame is varied.

12. In a stair-climbing vehicle comprising, in combination, a load container, a chassis-frame, primary means for propelling said vehicle upon the long inclines, an undercarriage, means for varying the relative inclination of said container and chassis-frame with respect to said undercarriage, a pair of front ground wheels for supporting said vehicle during travel over horizontal surfaces, means for driving said vehicle, at least one rear ground wheel connected to said undercarriage, said means for varying relative inclination comprising an adjustable strut extending between said chassis-frame and said undercarriage, said undercarriage being pivotally connected to said chassis-frame near said front ground wheel, and a pair of endless track assemblies in the vicinity of said wheels, each including end sheaves, of which one is a drive-sheave, and an intermediate sheave, each of said wheels being co-axial with said drive-sheave, said drive-sheaves being of less diameter than said wheels, frame-means for supporting said intermediate and one of said end sheaves, said frame means being axially connected for vertical rotation about the axes of said wheels and drive-sheaves, the outer diameter of said intermediate sheaves projecting slightly beyond the outer perimeter of said ground wheels, and means for rotating said track assemblies downwardly into ground pressing contact for relieving the load on said wheels at the commencement of the stair climbing operation.

References Cited by the Examiner

UNITED STATES PATENTS

| | | | |
|---|---|---|---|
| 710,845 | 10/1902 | Cummins | 280—5.24 |
| 2,426,342 | 8/1947 | Couse | 180—9.52 |
| 2,751,027 | 6/1956 | McLaughlin | 180—9.24 |
| 3,111,331 | 11/1963 | Locke | 280—5.22 |
| 3,127,188 | 3/1964 | Greub | 280—5.22 |

(References on following page)

UNITED STATES PATENTS

| | | | |
|---|---|---|---|
| 3,142,351 | 7/1964 | Green | 180—8 |
| 3,146,841 | 9/1964 | Locke | 280—5.22 |
| 3,166,138 | 1/1965 | Dunn | 180—9.24 |

FOREIGN PATENTS

| | | |
|---|---|---|
| 693,983 | 7/1953 | Great Britain. |
| 590,274 | 4/1959 | Italy. |

OTHER REFERENCES

Brochure: Wanted—A Stair Climbing Wheel Chair, National Inventors Council, January 1962, Washington, D.C. (A copy should be available from the Council.)

BENJAMIN HERSH, *Primary Examiner.*

R. J. JOHNSON, *Assistant Examiner.*